(12) United States Patent
Sung et al.

(10) Patent No.: US 11,326,727 B2
(45) Date of Patent: May 10, 2022

(54) QUICK CONNECTOR

(71) Applicant: Kyungdong Navien Co., LTD, Gyeonggi-do (KR)

(72) Inventors: O Hyun Sung, Seoul (KR); Tae Yun Kwon, Changwon-si (KR)

(73) Assignee: KYUNGDONG NAVIEN CO., LTD, Gyeonggi-Do (KR)

( * ) Notice: Subject to any disclaimer, the term of this patent is extended or adjusted under 35 U.S.C. 154(b) by 0 days.

(21) Appl. No.: 17/091,797

(22) Filed: Nov. 6, 2020

(65) Prior Publication Data
US 2021/0140572 A1  May 13, 2021

(30) Foreign Application Priority Data

Nov. 8, 2019 (KR) .................. 10-2019-0143035

(51) Int. Cl.
*F16L 37/084* (2006.01)
*F16L 37/12* (2006.01)

(52) U.S. Cl.
CPC ......... *F16L 37/122* (2013.01); *F16L 37/0841* (2013.01)

(58) Field of Classification Search
CPC ..................... F16L 37/086; F16L 37/0841
See application file for complete search history.

(56) References Cited

U.S. PATENT DOCUMENTS

| | | | | |
|---|---|---|---|---|
| 4,753,268 A | * | 6/1988 | Palau | F16L 37/0841 137/595 |
| 5,104,158 A | * | 4/1992 | Meyer | F16L 37/0841 285/308 |
| 5,316,041 A | * | 5/1994 | Ramacier, Jr. | F16L 37/0841 137/614.04 |
| 6,024,124 A | * | 2/2000 | Braun | F16L 37/0841 137/614.03 |
| 6,231,089 B1 | * | 5/2001 | DeCler | F16L 37/0841 285/308 |
| 6,871,878 B2 | * | 3/2005 | Miros | F16L 39/00 285/1 |
| 7,731,244 B2 | * | 6/2010 | Miros | A61M 39/105 285/317 |
| 2011/0204622 A1 | * | 8/2011 | Lewis | F16L 37/0841 285/313 |
| 2011/0210541 A1 | * | 9/2011 | Lewis | F16L 37/0841 285/317 |
| 2013/0300108 A1 | * | 11/2013 | Frick | F16L 37/0841 285/319 |

(Continued)

*Primary Examiner* — David Bochna
(74) *Attorney, Agent, or Firm* — Wegman Hessler

(57) ABSTRACT

A quick connector includes a socket having a socket opening and a plug inserted and coupled to the socket opening. The socket includes a socket body having a socket space into which the plug is inserted and a latch that hampers insertion of the plug into the socket space or stops the plug from escaping to the outside. The plug includes an insert body, an insert O-ring that surrounds the insert body, and an insert hook protruding outward from the insert body. The latch includes a latch frame, a latch opening formed in the latch frame, and a latch step that hides part of the latch opening, the latch step being disposed on the latch frame such that when the insert body is inserted into the socket space, the insert O-ring does not make contact with the latch step, but the insert hook makes contact with the latch step.

9 Claims, 9 Drawing Sheets

(56) References Cited

U.S. PATENT DOCUMENTS

2015/0076815 A1\* 3/2015 Lombardi, III ..... F16L 37/0841
285/317
2017/0045170 A1\* 2/2017 Lewis ................. F16L 37/0841
2017/0241581 A1\* 8/2017 Decker ................ F16L 37/086

\* cited by examiner

QUICK CONNECTOR

CROSS-REFERENCE TO RELATED APPLICATION

This application claims the benefit of priority to Korean Patent Application No. 10-2019-0143035, filed in the Korean Intellectual Property Office on Nov. 8, 2019, the entire contents of which are incorporated herein by reference.

TECHNICAL FIELD

The present disclosure relates to a quick connector of a hot-water mat.

BACKGROUND

A hot-water mat refers to a mat for heating that performs heating by circulating hot water heated to a set temperature in a boiler along a fluid channel in the mat. The hot-water mat has a structure in which a heating part for heating water and a fluid channel for circulating the water heated in the heating part to perform heating on the mat are connected with each other.

The fluid channel and the heating part of the hot-water mat may be integrally formed with each other. However, for convenience of management, the fluid channel and the heating part may be formed to be stored in a state of being separated from each other and to be connected with each other when heating is required. Through a portion where the fluid channel and the heating part are connected, water has to be able to flow from the fluid channel to the heating part or from the heating part to the fluid channel.

Accordingly, a connector for connecting the fluid channel and the heating part needs to have a structure for easy assembly and disassembly and needs to maintain the same coupling despite repeated use. Furthermore, the connector needs to maintain water tightness such that water easily flows when the connector is coupled and water leakage does not occur when the connector is separated.

SUMMARY

The present disclosure has been made to solve the above-mentioned problems occurring in the prior art while advantages achieved by the prior art are maintained intact.

An aspect of the present disclosure provides a quick connector capable of maintaining performance despite repeated use.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a quick connector includes a socket having a socket opening formed therein and a plug horizontally inserted into and coupled to the socket through the socket opening. The socket includes a socket body having a socket space that is in communication with the outside through the socket opening and into which the plug is inserted and a latch that, in a locking position, hampers insertion of the plug into the socket space or stops the plug inserted into the socket space from escaping to the outside. The plug includes an insert body inserted into the socket space, an insert O-ring that surrounds the insert body to maintain water tightness between the insert body and an inside surface of the socket body when the insert body is inserted into the socket space, and an insert hook further protruding outward from the insert body beyond an outside surface of the insert O-ring. The latch includes a latch frame, a latch opening formed in the latch frame, and a latch step that hides part of the latch opening, the latch step being disposed on a side surface of the latch frame such that when the insert body, together with the insert O-ring, is inserted into the socket space through the latch opening in the locking position, the insert O-ring does not make contact with the latch step, but the insert hook makes contact with the latch step.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
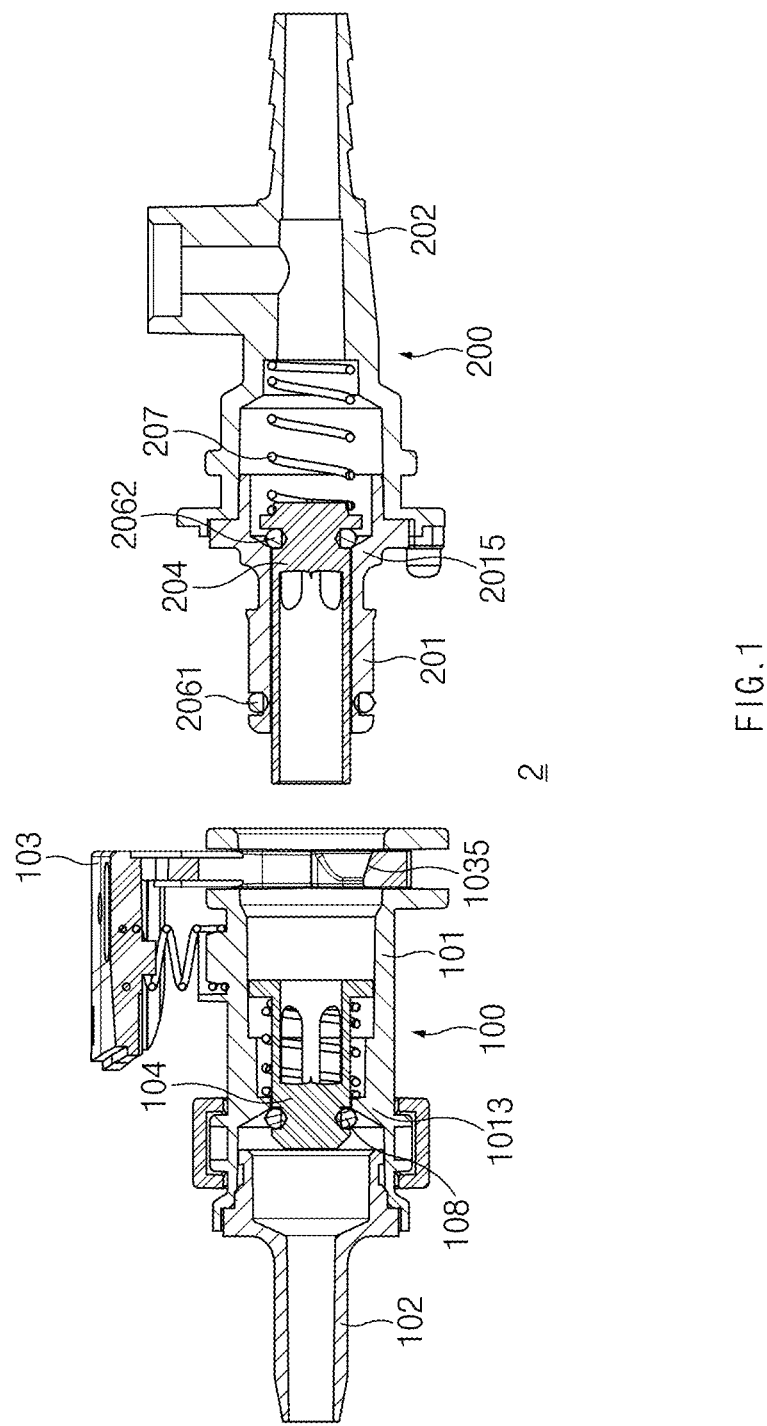
FIG. 1 is a longitudinal sectional view illustrating a state in which a socket and a plug of an exemplary quick connector are separated from each other.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the components. When a component is described as "connected", "coupled", or "linked" to another component, this may mean the components are not only directly "connected", "coupled", or "linked" but also are indirectly "connected", "coupled", or "linked" via a third component.

Figure 2:
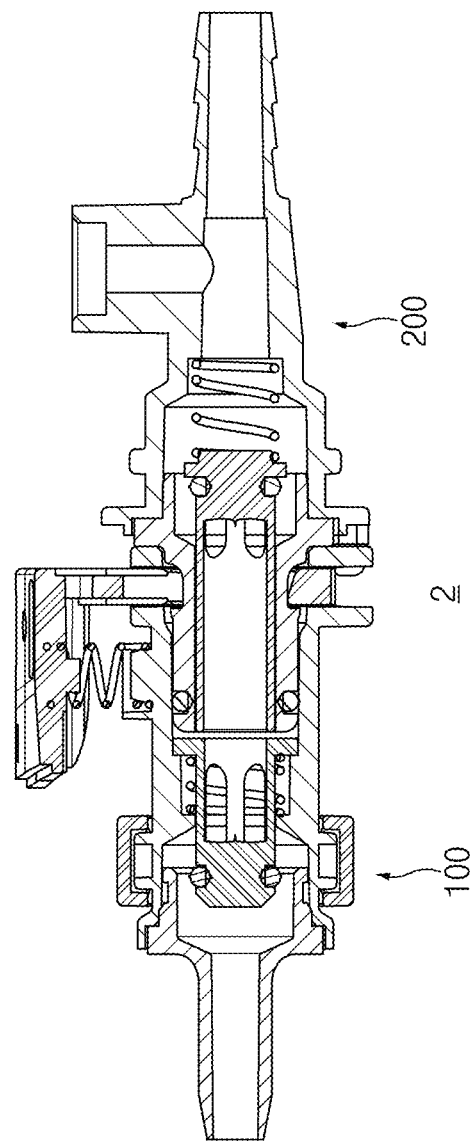
FIG. 2 is a longitudinal sectional view illustrating a state in which the socket and the plug of the exemplary quick connector are coupled with each other.

FIG. 1 is a longitudinal sectional view illustrating a state in which a socket 100 and a plug 200 of an exemplary quick connector 2 are separated from each other. FIG. 2 is a longitudinal sectional view illustrating a state in which the socket 100 and the plug 200 of the exemplary quick connector 2 are coupled with each other.

Referring to FIGS. 1 and 2, the exemplary quick connector 2 includes the socket 100 and the plug 200. At least two portions of a socket poppet valve 104 of the exemplary socket 100 may make direct contact with an inside surface of a socket body 101. When the socket poppet valve 104 moves toward the plug 200, a socket valve O-ring 108 coupled to the socket poppet valve 104 may make contact with an oblique surface of the inside surface of the socket body 101 that is formed in a socket intermediate-opening forming part 1013. The socket body 101 and a socket insert 102 may be coupled with each other in a form illustrated in the drawings. A latch step 1035 of a latch 103 of the socket 100 may be disposed to protrude to a higher position than the inside surface of the socket body 101 in a locking position of FIGS. 1 and 2. Accordingly, when the plug 200 enters the socket 100, a distal end of a plug insert 201 may collide with the latch step 1035, or an insert O-ring 2061 disposed to surround the plug insert 201 may collide with the latch step 1035.

A plug poppet valve 204 of the exemplary plug 200 may be received in the plug insert 201 and may be brought into contact with an inside surface of the plug insert 201 over a wide surface. The plug poppet valve 204 may be elastically supported by an elastic member 207 so as to be horizontally movable relative to a plug body 202. The plug insert 201 and the plug body 202 may be coupled as illustrated. When the plug 200 is inserted into the socket 100, the plug poppet valve 204 and the socket poppet valve 104 may be pressed against each other, and the positions of the plug poppet valve 204 and the socket poppet valve 104 relative to the plug insert 201 and the socket body 101 may be changed. Accordingly, a state in which water is able to flow may be formed as illustrated in FIG. 2. Furthermore, when the plug poppet valve 204 moves toward the socket 100, a plug valve O-ring 2062 coupled to the plug poppet valve 204 may make contact with an oblique surface of the inside surface of the plug insert 201 that is formed in a plug intermediate-opening forming part 2015.

Figure 3:
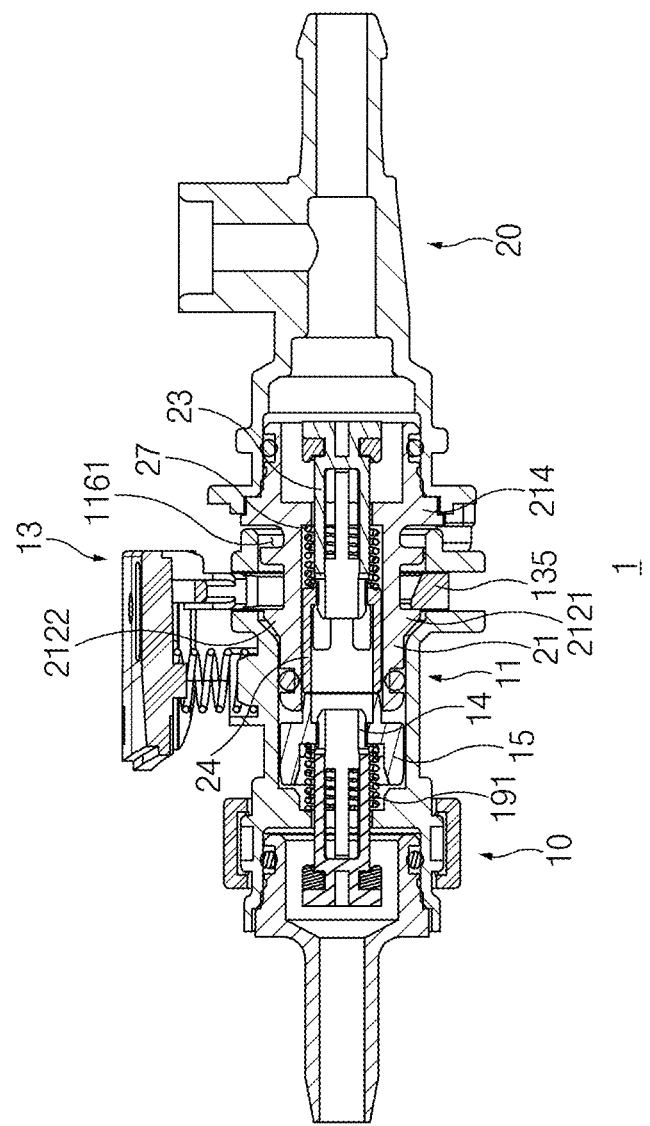
FIG. 3 is a longitudinal sectional view illustrating a state in which a socket and a plug of a quick connector according to an embodiment of the present disclosure are coupled with each other.
Figure 4:
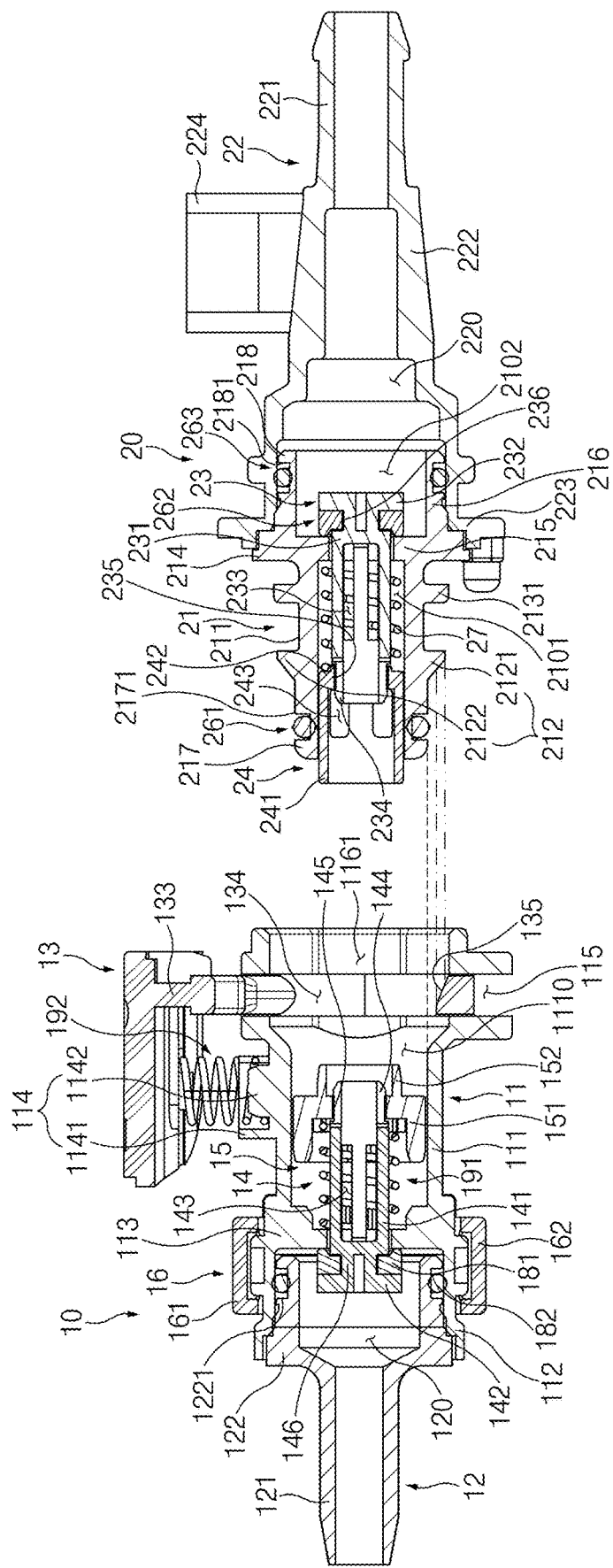
FIG. 4 is a longitudinal sectional view illustrating a state in which the socket and the plug of the quick connector according to the embodiment of the present disclosure are separated from each other.
Figure 5:
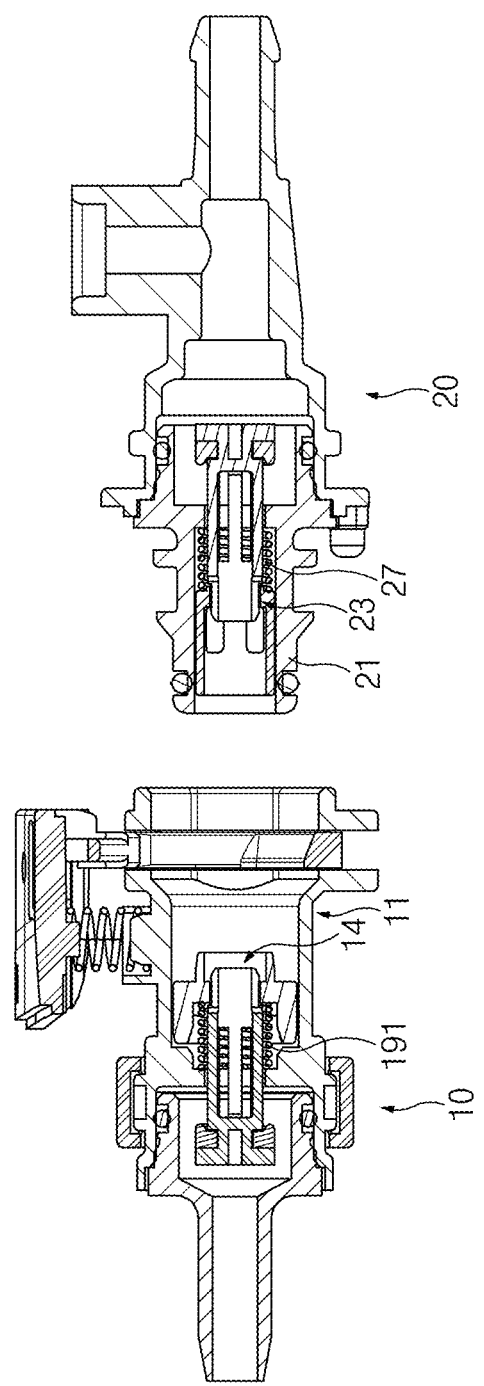
FIG. 5 is a longitudinal sectional view illustrating a state in which elastic members of the socket and the plug are compressed, with the socket and the plug of the quick connector according to the embodiment of the present disclosure separated from each other.
Figure 6:
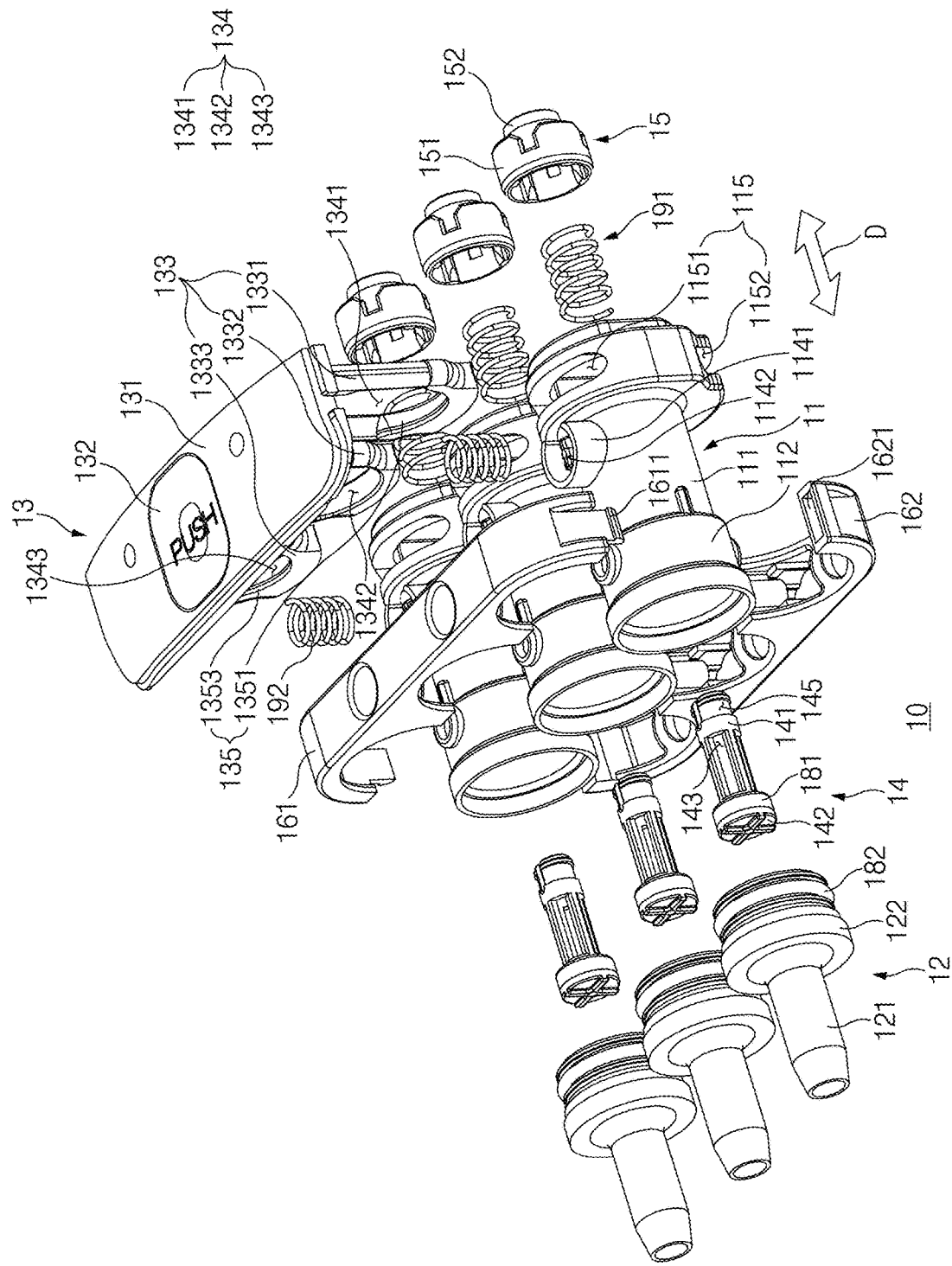
FIG. 6 is an exploded perspective view of the socket of the quick connector according to an embodiment of the present disclosure.
Figure 7:
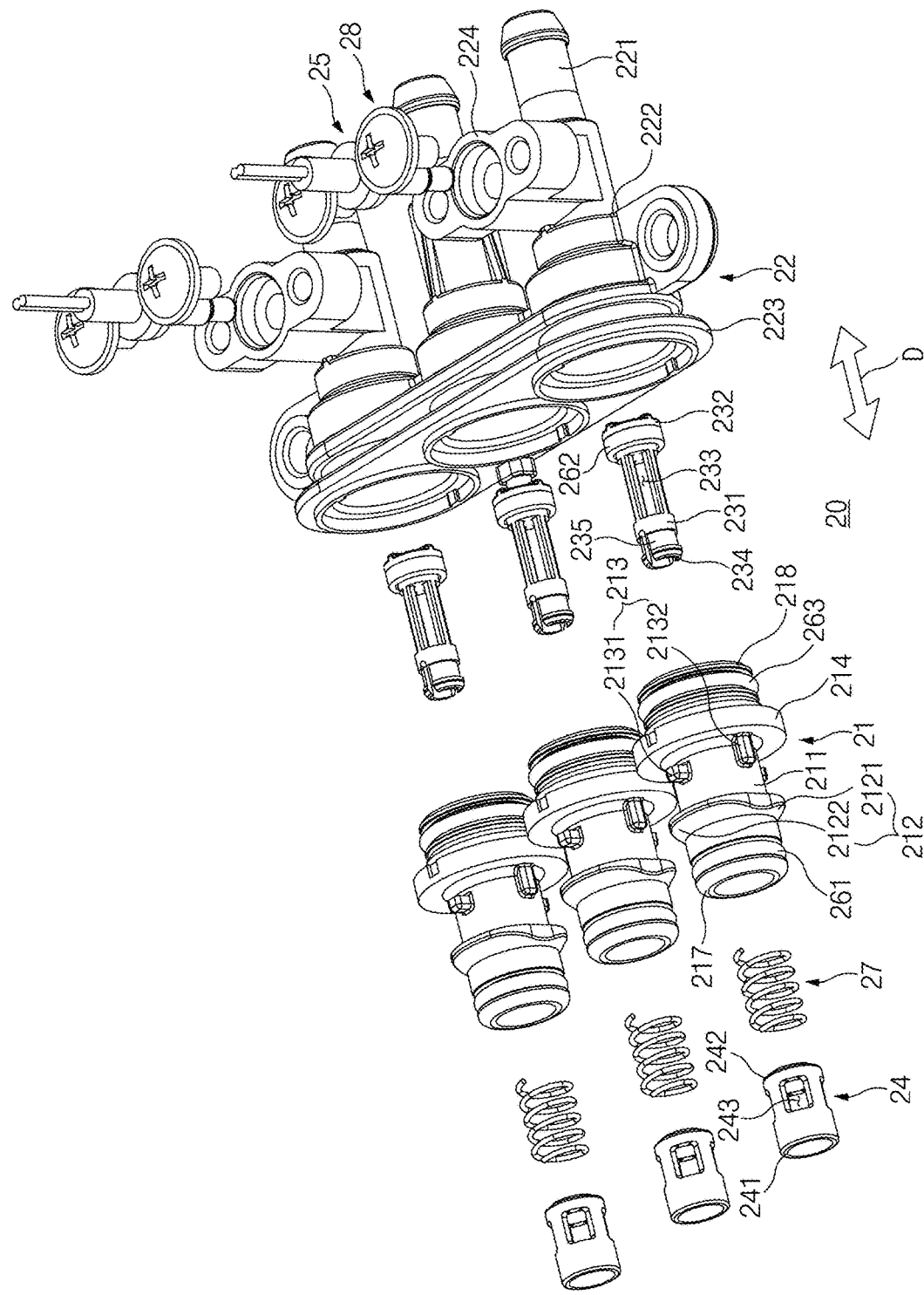
FIG. 7 is an exploded perspective view of the plug of the quick connector according to an embodiment of the present disclosure.

FIG. 3 is a longitudinal sectional view illustrating a state in which a socket 10 and a plug 20 of a quick connector 1 according to an embodiment of the present disclosure are coupled with each other. FIG. 4 is a longitudinal sectional view illustrating a state in which the socket 10 and the plug 20 of the quick connector 1 according to the embodiment of the present disclosure are separated from each other. FIG. 5 is a longitudinal sectional view illustrating a state in which elastic members of the socket 10 and the plug 20 are compressed, with the socket 10 and the plug 20 of the quick connector 1 according to the embodiment of the present disclosure separated from each other. FIG. 6 is an exploded perspective view of the socket 10 of the quick connector 1 according to an embodiment of the present disclosure. FIG. 7 is an exploded perspective view of the plug 20 of the quick connector 1 according to an embodiment of the present disclosure.

Referring to the drawings, the quick connector 1 according to the embodiment of the present disclosure includes the socket 10 and the plug 20. The socket 10 and the plug 20 may be coupled to constitute the quick connector 1. The socket 10 may be connected to one of a fluid channel of a mat and a heating part, and the plug 20 may be connected to the other. Accordingly, when the socket 10 and the plug 20 are coupled to constitute the quick connector 1, the fluid channel and the heating part may be coupled together. Water heated by the heating part may be delivered into the fluid channel, and the water cooled in the fluid channel may be delivered to the heating part.

In this specification, an up/down direction may refer to an up/down direction in each drawing, and a horizontal direction may refer to a horizontal direction in each drawing. However, the up/down direction and the horizontal direction may not actually refer to the vertical direction and the horizontal direction perpendicular thereto. Directions referred to as a horizontal direction and an up/down direction may vary depending on an arrangement state of the socket 10 and the plug 20.

Socket 10

The socket 10 according to an embodiment of the present disclosure may include a socket body 11 and may further include a socket poppet valve 14, a latch 13, a socket insert 12, a socket valve O-ring 181, a socket O-ring 182, a bracket 16, a socket elastic-member 191, a latch elastic-member 192, and a socket guide 15.

The socket body 11 may have a socket opening 1161 formed on one side thereof and a socket space 1110 formed therein. The socket space 1110 may be in communication with the outside through the socket opening 1161, and the plug 20 may be inserted into the socket space 1110. The socket space 1110 formed in the socket body 11 may be in communication with the outside through the socket opening 1161 on one side of the socket space 1110 and a socket intermediate-opening on an opposite side of the socket space 1110. The socket opening 1161 and the socket intermediate-opening may be open along the horizontal direction.

The socket body 11 may include a socket space forming part 111 that forms the socket space 1110, a socket insert receiving part 112 into which the socket insert 12 is fixedly inserted, and a socket intermediate-opening forming part 113 that forms the socket intermediate-opening and divides the socket space forming part 111 and the socket insert receiving part 112 from each other. In the drawings, the socket insert receiving part 112, the socket intermediate-opening forming part 113, and the socket space forming part 111 are disposed in sequence from left to right.

The socket intermediate-opening forming part 113 may connect the socket insert receiving part 112 and the socket space forming part 111. The socket intermediate-opening forming part 113 may protrude inward further than the socket space forming part 111 and the socket insert receiving part 112 and may form the socket intermediate-opening having a smaller cross-sectional area than the socket opening 1161.

The socket body 11 may have a latch insertion hole 115 formed in an area thereof that is adjacent to the socket opening 1161. A space for receiving an insert hook 2121 inserted through a latch opening 134 may be formed in a position adjacent to the latch insertion hole 115. Likewise, a space for receiving an insert guide 2122 disposed on the opposite side to the insert hook 2121 may be formed.

The socket 10 may include the socket poppet valve 14. The socket poppet valve 14 is a component that selectively opens and closes the socket intermediate-opening. The socket poppet valve 14 may be disposed to pass through the socket intermediate-opening and may move toward or away from the plug 20 along the horizontal direction to selectively open and close the socket intermediate-opening. When the socket intermediate-opening is closed, water delivered from the fluid channel or the heating part connected to the socket insert 12 of the socket 10 fails to flow into the socket space 1110, or water fails to flow from the socket space 1110 to the socket insert 12.

The socket poppet valve 14 may include a socket valve body 141 having an empty space inside and a socket valve head 142 further protruding outward beyond the socket valve body 141. The socket poppet valve 14 may have a socket packing groove 146 concavely formed between the socket valve head 142 and the socket valve body 141. The socket valve head 142 may be disposed in a socket outside-space 120.

The socket valve body 141 may have a plurality of socket valve holes 143 formed therein for allowing the empty space inside the socket valve body 141 to be in communication with the outside of the socket valve body 141. The socket valve holes 143 may be disposed along an outside surface of the socket valve body 141 and may have, but is not limited to, a form extending along the horizontal direction. When the socket poppet valve 14 is disposed in a close position to the plug 20 to the maximum, the socket valve holes 143 may be located only in the socket space 1110, and the socket valve body 141 may close the socket intermediate-opening. As the socket poppet valve 14 moves away from the plug 20, the socket valve holes 143 may be located in the socket space 1110 and the socket outside-space 120. Accordingly, the socket space 1110 and the socket outside-space 120 may be in communication with each other by the socket valve holes 143, and an effect of opening the socket intermediate-opening may be obtained.

The socket guide 15 is a component that is coupled to the socket poppet valve 14 and that guides a coupling of the socket 10 and the plug 20. The socket guide 15 may include a large-diameter portion 151 and a small-diameter portion 152. The large-diameter portion 151 may be coupled to an area of the socket poppet valve 14 that is adjacent to one end 144 of the socket poppet valve 14 that is close to the socket opening 1161, and the small-diameter portion 152 may protrude from the large-diameter portion 151 toward the plug 20 and may have a smaller outer diameter than the large-diameter portion 151. When a plug insert 21 is inserted into the socket space 1110, the socket guide 15 may guide insertion of the plug 20 into a correct position while inserting the small-diameter portion 152 into a plug space 2101.

The socket guide 15 may allow the socket poppet valve 14 to remain spaced apart from the remaining portion of the socket body 11 other than the socket intermediate-opening. That is, the large-diameter portion 151 of the socket guide 15 may be disposed between the socket poppet valve 14 and the socket body 11 along the radial direction of the socket poppet valve 14 such that an outside surface of the socket poppet valve 14 is spaced apart from an inside surface of the remaining portion of the socket body 11 other than the portion where the socket intermediate-opening is formed. Accordingly, when the socket body 11 and the socket insert 12 are welded by ultrasonic welding, shocks caused by ultrasonic waves may be prevented from being directly transmitted to the socket poppet valve 14.

The large-diameter portion 151 may have an outer diameter smaller than or equal to the inner diameter of the socket space forming part 111 of the socket body 11 that forms the socket space 1110, and thus the socket guide 15 may guide a stable movement of the socket poppet valve 14 along the horizontal direction. For the guide operation, the socket guide 15 may be disposed in the socket space 1110 so as to be movable in the horizontal direction.

A socket guide fixing groove 145 may be additionally formed on the socket valve body 141 to allow the socket poppet valve 14 and the socket guide 15 to move in conjunction with each other. The large-diameter portion 151 may be coupled to the socket guide fixing groove 145 and may be stopped from escaping from the socket poppet valve 14 in the horizontal direction.

A structure for allowing the inside of the socket valve body 141 to be open to the outside may be formed in a distal end of the socket poppet valve 14 that faces toward the plug 20. To allow water to enter and exit the socket valve body 141, the small-diameter portion 152 of the socket guide 15 in which the distal end of the socket poppet valve 14 is disposed may be formed in an annular shape that is open along the horizontal direction.

The socket guide 15 may have a shape further protruding toward the plug 20 beyond the socket poppet valve 14. Accordingly, when the plug 20 is inserted into the socket 10, a plug guide 24 may press the socket guide 15 to push the socket poppet valve 14 and open the socket intermediate-opening, and thus the socket 10 and the plug 20 may be in communication with each other. When the plug 20 is inserted into the socket 10, the small-diameter portion 152 including a distal end of the socket guide 15 that faces toward the plug 20 may be inserted into the plug insert 21 while pressing the plug guide 24 into the plug insert 21.

The socket valve O-ring 181 is an annular member coupled to the socket poppet valve 14. The socket valve O-ring 181 may be coupled to the socket poppet valve 14 to maintain water tightness of the socket intermediate-opening by filling a gap between the socket poppet valve 14 and the socket intermediate-opening forming part 113 when the socket poppet valve 14 closes the socket intermediate-opening. The socket valve O-ring 181 may be formed of an elastic material and may effectively maintain the water tightness of the socket intermediate-opening.

The socket valve O-ring 181 may be coupled to the socket packing groove 146. The socket valve O-ring 181 may have an inner diameter smaller than the diameter of the socket intermediate-opening and may have an outer diameter larger than the diameter of the socket intermediate-opening. Accordingly, when the socket poppet valve 14 moves toward the plug 20, the socket valve O-ring 181 may be stopped by the socket intermediate-opening forming part 113, and a movement of the socket poppet valve 14 toward the plug 20 may be stopped.

A side surface of the socket intermediate-opening forming part 113 that meets the socket valve O-ring 181 when the socket poppet valve 14 closes the socket intermediate-opening may be perpendicular to the horizontal direction in which the socket poppet valve 14 moves. In a case where the side surface is formed to be an oblique surface, the socket valve O-ring 181 may easily escape by climbing up the oblique surface. However, this situation may not occur in the case of the socket poppet valve 14 according to the embodiment of the present disclosure. This is because a side surface of the socket packing groove 146 that faces toward the socket valve head 142 and the above-described side surface of the socket intermediate-opening forming part 113 are formed perpendicular to the horizontal direction and the socket valve O-ring 181 is inserted between the side surfaces.

The socket elastic-member 191 may elastically support the socket guide 15 and the socket intermediate-opening forming part 113 of the socket body 11 along the horizontal direction. As the socket guide 15 moves in conjunction with the socket poppet valve 14, the socket elastic-member 191 has a property of returning the socket poppet valve 14 to a default position. The default position of the socket poppet valve 14 is a position in which the socket poppet valve 14 closes the socket intermediate-opening as illustrated in FIG. 4. Accordingly, in a situation in which the socket poppet valve 14 opens the socket intermediate-opening as illustrated in FIG. 3 or 5, the socket elastic-member 191 is compressed and acts an elastic force in a direction to return the socket poppet valve 14 to the default position.

The socket elastic-member 191 may be disposed in the socket space 1110 and may be disposed in a form that surrounds the socket poppet valve 14. To prevent opposite ends of the socket elastic-member 191 that are disposed on the socket guide 15 and the socket intermediate-opening forming part 113 from escaping in a direction across the horizontal direction, the socket guide 15 and the socket intermediate-opening forming part 113 may have a form that surrounds the socket elastic-member 191.

The socket insert 12 is a component coupled to the socket body 11 to cover, from the outside, the area where the socket intermediate-opening is formed, thereby forming the socket outside-space 120 through which the socket intermediate-opening is in communication with the outside. The socket insert 12 may include a socket connecting part 121 connected with the fluid channel or the heating part through a hose, or the like and a socket coupling part 122 connected to the socket connecting part 121.

The socket coupling part 122 may be inserted into the socket insert receiving part 112 of the socket body 11 and may cover, from the outside, the area where the socket intermediate-opening is formed, thereby forming the socket outside-space 120. The socket outside-space 120 may be in communication with the fluid channel or the heating part through the socket connecting part 121 and the hose connected to the socket connecting part 121. An outside surface of the socket coupling part 122 and an inside surface of the socket insert receiving part 112 of the socket body 11 may be firmly coupled with each other by ultrasonic welding.

The socket O-ring 182, which is an annular component disposed for water tightness, may be disposed between the socket insert receiving part 112 and the socket coupling part 122 of the socket insert 12. A socket insert groove 1221 in which the socket O-ring 182 is disposed may be concavely formed on the outside surface of the socket coupling part 122 of the socket insert 12.

As the socket O-ring 182 is disposed, water tightness between the socket body 11 and the socket insert 12 may be maintained even though there is a portion where the socket body and the socket insert 12 are not completely welded by ultrasonic welding.

The bracket 16 may be disposed to more firmly couple the socket insert 12 and the socket body 11. The bracket 16 presses the socket body 11 from the outside to the inside and helps to more firmly couple the socket insert 12 and the socket body 11 and maintain water tightness. Furthermore, the bracket 16 may serve to stably fix and support a plurality of socket bodies 11 separated from one another.

The bracket 16 may include an upper bracket 161 and a lower bracket 162. The upper bracket 161 and the lower bracket 162 may be coupled with each other while covering upper and lower sides of the socket insert receiving part 112 of each of the socket bodies 11. To more firmly couple the upper bracket 161 and the lower bracket 162, an upper bracket coupling part 1611 and a lower bracket coupling part 1621 may be formed to be coupled by a snap-fit connection. As the upper bracket 161 and the lower bracket 162 are coupled together while surrounding the socket body 11, the upper bracket 161 and the lower bracket 162 may strongly press the socket body 11 from the outside to the inside.

The latch 13 is a component that hampers insertion of the plug 20 and prevents the inserted plug 20 from being released from the socket 10. The latch 13 may be disposed in a locking position or an open position that is a position relative to the socket body 11. In the locking position, the latch 13 may hamper insertion of the plug 20 into the socket space 1110 and may stop the plug 20 inserted into the socket space 1110 from escaping to the outside. In the open position, the latch 13 does not hamper the insertion of the plug 20 into the socket space 1110 and does not stop the inserted plug 20 from escaping to the outside.

Figure 8:
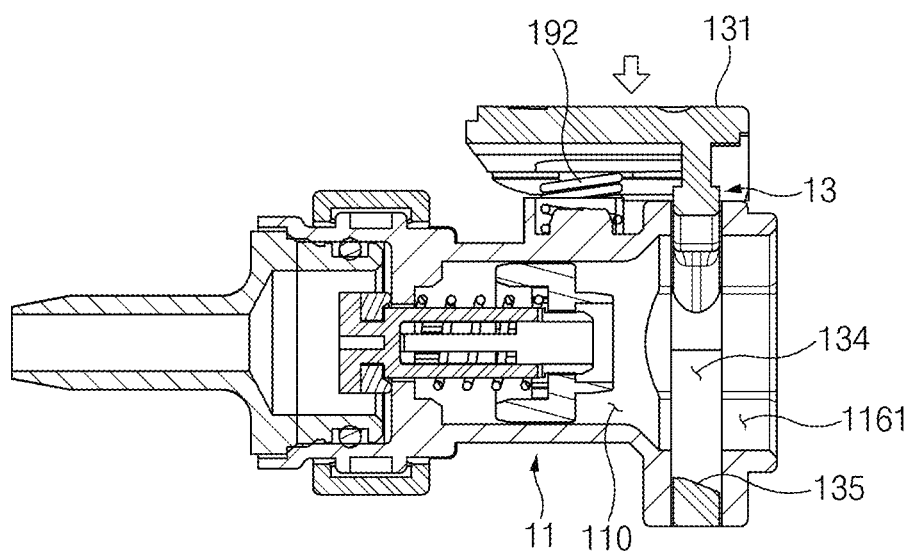
FIG. 8 is a longitudinal sectional view illustrating a state in which a latch of the socket of the quick connector according to an embodiment of the present disclosure is pressed and is disposed in an open position.

FIG. 8 is a longitudinal sectional view illustrating a state in which the latch 13 of the socket 10 of the quick connector 1 according to an embodiment of the present disclosure is pressed and is disposed in the open position.

Additionally, referring to FIG. 8, the open position can be seen. The latch 13 may be inserted into the socket body 11 through the latch insertion hole 115 vertically formed through the socket body 11. The latch insertion hole 115 may include an upper latch insertion hole 1151 formed through an upper side of the socket body 11 and a lower latch insertion hole 1152 formed through a lower side of the socket body 11.

In the locking position of FIG. 4, the latch opening 134 formed in the center of a latch frame 133 connected to a latch operation part 131 is not aligned with the socket opening 1161 and is disposed in a position in which a lower side of the latch frame 133 hides part of the socket opening 1161 or the socket space 1110. Accordingly, assuming that the latch 13 does not move, the plug 20 cannot be inserted into the socket 20 by being blocked by the latch 13 even though the plug 20 is pushed toward the socket 10. Accordingly, in a case of inserting the plug 20 into the socket 10 by applying a force of a predetermined magnitude or less, insertion of the plug 20 may be stopped by the latch 13.

Likewise, assuming that the latch 13 does not move in a state in which the plug 20 is inserted into the socket 10 as illustrated in FIG. 3, the plug 20 cannot be removed from the socket 10 even though the plug 20 is pulled outside the socket 10, and the insert hook 2121 of the plug 20, which will be described below, is stopped by the latch 13 so that removal of the plug 20 is stopped.

However, the latch 13 is disposed so as to be vertically movable through the latch insertion hole 115. Accordingly, when the plug 20 is inserted into the socket 10, the plug 20 forcibly moves the latch 13 from the locking position to the open position illustrated in FIG. 8 by pushing the latch frame 133 downward while being inserted into the latch opening 134. Specifically, the plug 20 may enter the socket 10 while the insert hook 2121 included in the plug 20 makes contact with a latch step 135 disposed on a lower side of the latch frame 133 and presses the latch step 135 downward.

To facilitate insertion of the plug 20, the insert hook 2121 and the latch step 135 may have a profile inclined with respect to the horizontal direction in the longitudinal sectional views of FIGS. 3 and 4. Inclined surfaces of the insert hook 2121 and the latch step 135 may meet each other to guide insertion of the plug 20. Accordingly, the plug 20 and the socket 10 may be easily coupled by simply applying a force of more than a predetermined magnitude to the plug 20 without a separate operation.

Meanwhile, in a case of removing the plug 20 from the socket 10, the insert hook 2121 is stopped by the latch step 135, and the removal of the plug 20 is stopped without the same action as that when the plug 20 is inserted into the socket 10. Accordingly, after the plug 20 is inserted into the socket 10, the plug 20 may not be easily removed from the socket 10 as long as there is no separate artificial operation.

A user may perform an appropriate operation to remove the plug 20 inserted into the socket 10 from the socket 10. For the operation to remove the plug 20 from the socket 10, the latch 13 may include the latch operation part 131. The latch operation part 131 is disposed on an upper side of the latch 13. However, the position of the latch operation part 131 is not limited thereto. The latch operation part 131 may have a latch button 132 concavely formed thereon such that the user easily pushes the latch button 132.

The latch 13 may be basically disposed in the locking position. When the latch button 132 is pushed downward, the latch frame 133 connected to the latch operation part 131 may move downward through the latch insertion hole 115, and the latch 13 may move to the open position. As can be seen in FIGS. 3 and 4, the socket elastic-member 191 and a plug elastic-member 27 are compressed and store potential energies caused by elastic forces, with the plug 20 inserted into the socket 10. This state is maintained by the insert hook 2121 and the latch step 135. As the latch step 135 moves downward and the latch 13 is placed in the open position so that the plug 20 can be removed from the socket 10, the compressed socket elastic-member 191 and the compressed plug elastic-member 27 return to the original states and separate the plug 20 and the socket 10 by applying elastic forces to the plug 20 and the socket 10 in directions away from each other. Accordingly, the plug 20 may be easily removed from the socket 10 by the simple operation of pushing the latch button 132 with the plug 20 inserted into the socket 10. However, the same action may be achieved by an operation of pushing the latch operation part 131 rather than the latch button 132 downward.

The latch operation part 131 may be elastically supported by the latch elastic-member 192 so as to be vertically movable relative to the socket body 11. That is, opposite ends of the latch elastic-member 192 may be connected to the latch operation part 131 and the socket body 11, respectively. The latch elastic-member 192 may be, but is not limited to, a coil spring having elasticity.

The socket body 11 may include an elastic member connecting part 114 to which the latch elastic-member 192 having a coil spring form is connected. The elastic member connecting part 114 may include an elastic member connecting protrusion 1142 protruding upward and an elastic member receiving part 1141 protruding upward in an annular shape. The latch elastic-member 192 may be disposed between the elastic member receiving part 1141 and the elastic member connecting protrusion 1142 and may be prevented from escaping in a direction across the up/down direction.

In a state in which no external force is applied to the latch 13, the latch 13 may be located in the locking position by the latch elastic-member 192 and may have a property of returning to the locking position. Accordingly, the state of the latch elastic-member 192 illustrated in FIGS. 3 and 4 corresponds to a default state, and in the opening position illustrated in FIG. 8, the latch elastic-member 192 is compressed and applies an elastic force to the latch 13 upward.

The latch step 135 may be disposed on a lower side of an inside surface of the latch frame 133 and may hide part of the latch opening 134 formed through the latch frame 133 along the horizontal direction. The latch step 135 may be disposed on the inside surface of the latch frame 133 such that when an insert body 211, together with the insert O-ring 261, is inserted into the socket space 1110 through the latch opening 134 in the locking position, an insert O-ring 261 does not make contact with the latch step 135, but the insert hook 2121 makes contact with the latch step 135. The position relationship in the up/down direction is represented by a dotted line, a dash-dot-dash line, and a dash-dot-dot line in FIG. 4.

Figure 9:
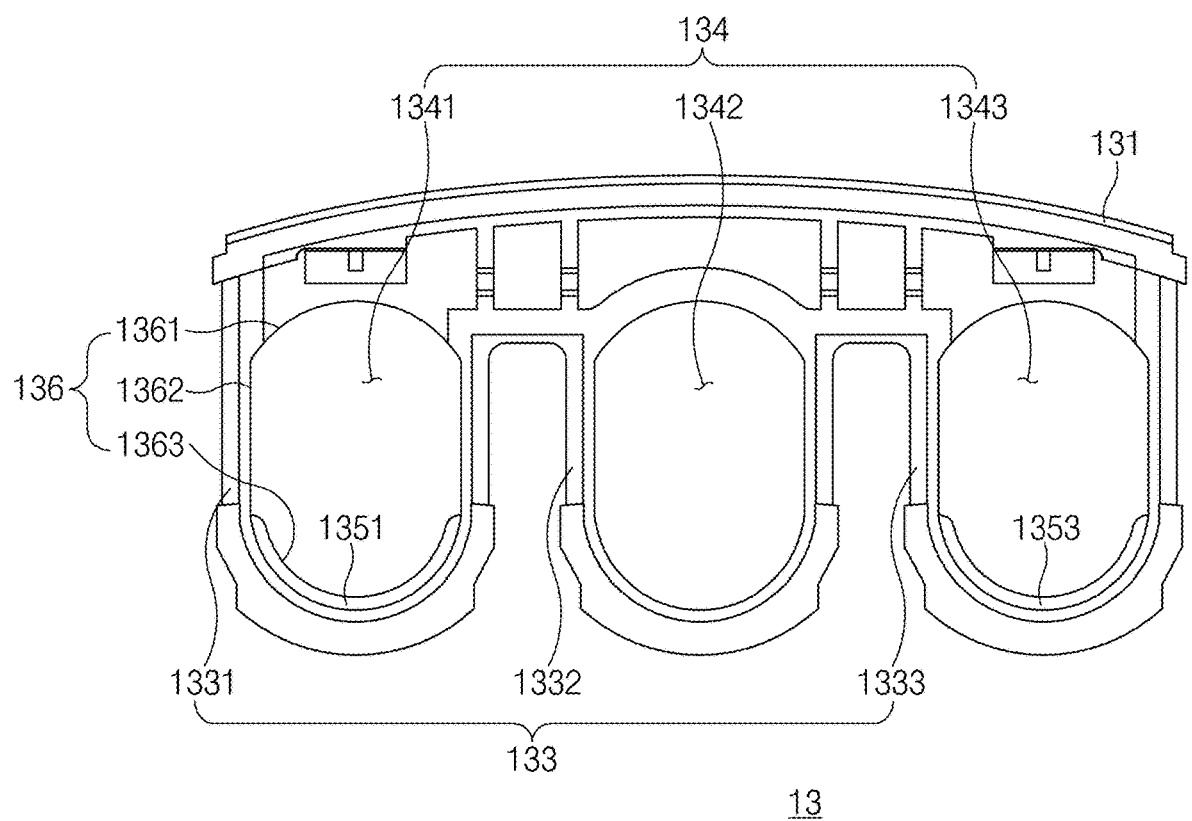
FIG. 9 is a front view of the latch of the quick connector according to an embodiment of the present disclosure.

FIG. 9 is a front view of the latch 13 of the quick connector 1 according to an embodiment of the present disclosure.

Additionally, referring to FIG. 9, the latch 13 may include a plurality of latch openings 134 and may further include a plurality of frame pieces formed by dividing the latch frame 133 for the formation of the latch openings 134. In an embodiment of the present disclosure, the latch 13 includes a total of three latch openings 134, including a first latch opening 1341, a second latch opening 1342, and a third latch opening 1343 and includes a total of three frame pieces, including a first frame piece 1331, a second frame piece 1332, and a third frame piece 1333. The frame pieces may be formed in an annular shape, and inner surfaces of the frame pieces may define the latch openings 134.

Each of components, such as the socket body 11, the socket insert 12, and the like, according to an embodiment of the present disclosure may be formed in plural, or may be formed as a single body having independent portions, similarly to the above-described structure of the latch frame 133. Accordingly, the plurality of latch openings 134 and the plurality of frame pieces may be formed, and the component may use the divided portions of the latch 13.

Profiles 136 of the latch openings 134 will be described below by using the first latch opening 1341. The profiles 136 of the latch openings 134 may each include an upper profile 1362 formed in an arc shape convex upward, a lower profile 1363 formed in a curved shape including an arc shape convex downward, and an intermediate profile 1362 formed of two line segments that connect the upper profile 1361 and the lower profile 1363 in the up/down direction.

The radius of curvature of the portion of the lower profile 1363 that forms the arc shape convex downward may be smaller than the radius of curvature of the upper profile 1361. That is, the profiles 136 of the latch openings 134 may have an asymmetrical structure with respect to a horizontal plane.

The latch openings 134 may have the above-described profiles because the latch step 135 is disposed on a lower side of an inside surface of a frame piece.

The latch step 135 may be disposed on an inside surface of a frame piece that defines at least one of the plurality of latch openings 134 and may not be disposed on an inside surface of a frame piece that defines at least one other latch opening. In the embodiment of the present disclosure illustrated in FIG. 9, a first latch step 1351 and a third latch step 1353 may be disposed on inside surfaces of the first frame piece 1331 and the third frame piece 1333. However, the latch step 135 is not disposed on the second frame piece 1332 located in the center.

In a case where a plurality of plugs 20 are inserted into a plurality of socket bodies 11, the user may have to apply an excessively large force for a coupling of the quick connector 1 if all the plugs 20 have to be inserted into the socket bodies 11 while pushing the latch steps 135. However, in the embodiment of the present disclosure, a part of the latch steps 135 is eliminated such that a part of the plugs 20 does not meet the latch step 135. Accordingly, the magnitude of a force required for a coupling of the quick connector 1 may be reduced, which enables the user to more easily couple the quick connector 1. After the coupling of the quick connector 1 is completed, the coupling may be firmly maintained by the latch steps 135 holding the other plugs 20.

Plug 20

The plug 20 according to an embodiment of the present disclosure may include the plug insert 21 and may further include a plug poppet valve 23, a plug body 22, the plug guide 24, the plug elastic-member 27, a plug valve O-ring 262, the insert O-ring 261, a plug O-ring 263, a sensor 25, and a fastener 28.

The plug insert 21 is a component inserted into and coupled to the socket 10 through the socket opening 1161. The plug insert 21 may include the insert body 211 and an insert protrusion 212, and the insert protrusion 212 may include the insert hook 2121 and the insert guide 2122.

The insert body 211, which is a part inserted into the socket space 1110, may include a plug space forming part 217 that forms the plug space 2101, a plug insert insertion part 216 formed to be inserted into and coupled to the plug body 22, and a plug intermediate-opening forming part 215 that forms a plug intermediate-opening and divides the plug space forming part 217 and the plug insert insertion part 216 from each other. The plug intermediate-opening forming part 215 may protrude inward from the plug space forming part 217 and may form the plug intermediate-opening. The insert hook 2121 and the insert guide 2122 may protrude outward from the plug space forming part 217.

The insert O-ring 261 is an annular component that surrounds the insert body 211 to maintain water tightness between the insert body 211 and the inside surface of the socket body 11 when the insert body 211 is inserted into the socket space 1110. When the insert body 211 is inserted into the socket 10, the insert O-ring 261 is disposed between the inside surface of the socket body 11 and the insert body 211 and makes contact with the inside surface of the socket body 11 and the insert body 211 to maintain the water tightness therebetween. To maintain the water tightness, the insert O-ring 261 may be formed of an elastic material.

The insert O-ring 261 may be disposed in an insert outside-groove 2171 concavely formed on the insert body 211 in the radial direction. The insert outside-groove 2171 may be formed on an area adjacent to a distal end of the insert body 211 that faces toward the socket 10.

The insert hook 2121 further protrudes outward from the insert body 211 beyond an outside surface of the insert O-ring 261. The insert hook 2121 may be disposed farther away from the socket 10 than the insert O-ring 261.

The insert hook 2121 may protrude downward from a lower side of the insert body 211. The insert hook 2121 may have an inclined shape further protruding outward while getting farther away from the socket 10, such that the insert hook 2121 is inserted into the socket body 11 while pushing the latch step 135 placed in the locking position when the plug 20 is inserted into the socket 10. Similarly, the latch step 135 may have an inclined shape further protruding inward while getting farther away from the plug 20.

In a situation in which the distal end of the insert body 211 is inserted into the socket space 1110, the height of the insert hook 2121 with respect to the up/down direction may be greater than the distance from the lower side of the insert body 211 to the latch step 135 placed in the locking position. Accordingly, when the plug 20 is inserted into the socket 10, the insert body 211 and the insert O-ring 261 may not be stopped by the latch step 135, and only the insert hook 2121 may be stopped by the latch step 135. When the plug 20 is press-fit into the socket 10 by a force of more than a predetermined magnitude, the insert hook 2121 may be inserted while moving the latch 13 to the open position by pushing the latch step 135 and pressing the latch 13 downward.

The insert guide 2122 protrudes upward from an upper side of the insert body 211 and guides insertion of the insert body 211 into the socket space 1110 without a collision of the insert body 211 with the inside surface of the socket body 11.

The insert guide 2122 may be formed to be symmetric to the insert hook 2121 with respect to the insert body 211. As the insert guide 2122 is formed to be symmetric to the insert hook 2121, when the plug 20 is inserted into the socket 10, the insert guide 2122 may prevent one of an upper side and a lower side of the insert O-ring 261 from being unevenly worn by the inside surfaces of the socket body 11 and the latch 13 or escaping from the insert outside-groove 2171.

The plug insert 21 may further include an insert protrusion 213 protruding outward from the insert body 211. The insert protrusion 213 may include a first insert protrusion 2131 protruding from the insert body 211 in the up/down direction and a second insert protrusion 2132 protruding from the insert body 211 in the horizontal direction.

The plug poppet valve 23 is a component that selectively opens and closes the plug intermediate-opening through which the plug space 2101 in the plug insert 21 is in communication with the outside. Similarly to the socket poppet valve 14, the plug poppet valve 23 may be disposed to pass through the plug intermediate-opening and may move toward or away from the socket 10 to close or open the plug intermediate-opening.

When the plug intermediate-opening is closed, water delivered from the fluid channel or the heating part connected to the plug body 22 fails to flow into the plug space 2101, or water fails to flow from the plug space 2101 to the plug body 22.

The plug poppet valve 23 may include a plug valve body 231 having an empty space inside and a plug valve head 232 further protruding outward beyond the plug valve body 231. The plug poppet valve 23 may have a plug packing groove 236 concavely formed between the plug valve head 232 and the plug valve body 231. The plug valve head 232 may be disposed in a plug outside-space 2102 of the plug insert 21 that is in communication with a plug body space 220.

The plug valve body 231 may have a plurality of plug valve holes 233 formed therein for allowing the empty space inside the plug valve body 231 to be in communication with the outside of the plug valve body 231. The plug valve holes 233 may be disposed along an outside surface of the plug valve body 231 and may have, but is not limited to, a form extending along the horizontal direction. When the plug poppet valve 23 is disposed in a close position to the socket 10 to the maximum, the plug valve holes 233 may be located only in the plug space 2101, and the plug valve body 231 may close the plug intermediate-opening. As the plug poppet valve 23 moves away from the socket 10, the plug valve holes 233 may be located in the plug space 2101 and the plug outside-space 2102. Accordingly, the plug space 2101 and the plug outside-space 2102 may be in communication with each other by the plug valve holes 233, and an effect of opening the plug intermediate-opening may be obtained.

The plug guide 24 is a component that is coupled to the plug poppet valve 23 and that protrudes outside the plug insert 21. The plug guide 24 may be coupled to one end of the plug poppet valve 23 that faces toward the socket 10.

The plug guide 24 may allow the plug poppet valve 23 to remain spaced apart from the remaining portion of the plug insert 21 other than the plug intermediate-opening. That is, the plug guide 24 may be disposed between the plug poppet valve 23 and the plug insert 21 along the radial direction of the plug poppet valve 23 and may space an outside surface of the plug poppet valve 23 apart from an inside surface of the remaining portion of the plug insert 21 other than the portion where the plug intermediate-opening is formed. Accordingly, when the plug insert 21 and the plug body 22 are welded by ultrasonic welding, shocks caused by ultrasonic waves may be prevented from being directly transmitted to the plug poppet valve 23.

The plug guide 24 may have an outer diameter smaller than or equal to the inner diameter of the plug space forming part 217 of the plug insert 21 that forms the plug space 2101, and thus the plug guide 24 may guide a stable movement of the plug poppet valve 23 along the horizontal direction. For the guide operation, the plug guide 24 may be disposed in the plug space 2101 so as to be movable in the horizontal direction.

A plug guide fixing groove 235 may be additionally formed on the plug valve body 231 to allow the plug poppet valve 23 and the plug guide 24 to move in conjunction with each other. The plug guide 24 may be coupled to the plug guide fixing groove 235 and may be stopped from escaping from the plug poppet valve 23 in the horizontal direction.

A structure for allowing the inside of the plug valve body 231 to be open to the outside may be formed in a distal end 234 of the plug poppet valve 23 that faces toward the socket 10. To allow water to enter and exit the plug valve body 231, the plug guide 24 further protruding toward the socket 10 beyond the plug poppet valve 23 may be formed in an annular shape in which one end 241 facing toward the socket 10 and an opposite end 242 facing away from the socket 10 are open along the horizontal direction. Furthermore, the plug guide 24 may have a guide opening 243 formed therein so as to be open in the radial direction. A plurality of guide openings 243 may be formed.

When the plug 20 is inserted into the socket 10, the one end 241 of the plug guide 24, which is adjacent to the socket 10, may be pressed by the socket 10, and the plug guide 24 may push the plug poppet valve 23 to open the plug intermediate-opening, thereby allowing the socket 10 and the plug 20 to be in communication with each other. In this situation, the plug insert 21 may be pressed through the plug elastic-member 27. The plug elastic-member 27 is connected to the plug insert 21 rather than the plug body 22. Accordingly, unlike in FIGS. 1 and 2, the plug elastic-member 27 does not apply an elastic force in a direction which the plug insert 21 and the plug body 22 are separated from each other. Thus, a coupling of the plug insert 21 and the plug body 22 may be firmly maintained, and water tightness of the plug 20 may be maintained.

The plug elastic-member 27 may elastically support the plug guide 24 and the plug intermediate-opening forming part 215 of the plug insert 21 along the horizontal direction. As the plug guide 24 moves in conjunction with the plug poppet valve 23, the plug elastic-member 27 has a property of returning the plug poppet valve 23 to a default position. The default position of the plug poppet valve 23 is a position in which the plug poppet valve 23 closes the plug intermediate-opening as illustrated in FIG. 4. Accordingly, in a situation in which the plug poppet valve 23 opens the plug intermediate-opening as illustrated in FIG. 3 or 5, the plug elastic-member 27 is compressed and acts an elastic force in a direction to return the plug poppet valve 23 to the default position.

The plug elastic-member 27 may be disposed in the plug space 2101 and may be disposed in a form that surrounds the plug poppet valve 23.

The plug elastic-member 27 and the socket elastic-member 191 may be coil springs. However, an elastic member capable of being used as the plug elastic-member 27 or the socket elastic-member 191 is not limited thereto.

The plug valve O-ring 262 is an annular member coupled to the plug poppet valve 23. The plug valve O-ring 262 may be coupled to the plug poppet valve 23 to maintain water tightness of the plug intermediate-opening by filling a gap between the plug poppet valve 23 and the plug intermediate-opening forming part 215 when the plug poppet valve 23 closes the plug intermediate-opening. The plug valve O-ring 262 may be formed of an elastic material and may effectively maintain the water tightness of the plug intermediate-opening.

The plug valve O-ring 262 may be coupled to the plug packing groove 236. The plug valve O-ring 262 may have an inner diameter smaller than the diameter of the plug intermediate-opening and may have an outer diameter larger than the diameter of the plug intermediate-opening. Accordingly, when the plug poppet valve 23 moves toward the socket 10, the plug valve O-ring 262 may be stopped by the plug intermediate-opening forming part 215, and a movement of the plug poppet valve 23 toward the socket 10 may be stopped.

A side surface of the plug intermediate-opening forming part 215 that meets the plug valve O-ring 262 when the plug poppet valve 23 closes the plug intermediate-opening may be perpendicular to the horizontal direction in which the plug poppet valve 23 moves. In a case where the side surface is formed to be an oblique surface, the plug valve O-ring 262 may easily escape by climbing up the oblique surface. However, this situation may not occur in the case of the plug poppet valve 23 according to the embodiment of the present disclosure. This is because a side surface of the plug packing groove 236 that faces toward the plug valve head 232 and the above-described side surface of the plug intermediate-opening forming part 215 are formed perpendicular to the horizontal direction and the plug valve O-ring 262 is inserted between the side surfaces.

The plug body 22 is a component coupled to the plug insert insertion part 216 to allow the plug outside-space 2102 to be in communication with the outside. The plug body 22 may include a plug connecting part 221 connected with the fluid channel or the heating part through a hose, or the like and a plug coupling part 222 connected to the plug connecting part 221.

The plug insert insertion part 216 of the plug insert 21 is inserted into the plug coupling part 222. Accordingly, the plug outside-space 2102 may be in communication with the plug body space 220 formed in the plug coupling part 222. The plug body space 220 may be in communication with the fluid channel or the heating part through the plug connecting part 221 and the hose connected to the plug connecting part 221. An inside surface of the plug coupling part 222 and an outside surface of the plug insert insertion part 216 may be firmly coupled together by ultrasonic welding.

The plug O-ring 263, which is an annular component disposed for water tightness, may be disposed between the plug insert insertion part 216 and the plug coupling part 222 of the plug body 22. The plug insert insertion part 216 may have, on the outside surface thereof, an insert insertion groove in which the plug O-ring 263 is disposed.

As the plug O-ring 263 is disposed, water tightness between the plug body 22 and the plug insert 21 may be maintained even though there is a portion where the plug body 22 and the plug insert 21 are not completely welded by ultrasonic welding.

The plug body 22 may include a sensor installation part 224. The sensor 25 may be coupled to the sensor installation part 224. The sensor 25 may make contact with water in the plug body 22 through the sensor installation part 224.

The sensor 25 may be a water temperature sensor for obtaining the temperature of the water. The sensor 25 may obtain the temperature of the water and may transmit the temperature value in the form of an electrical signal to a control device of a hot-water mat. The fastener 28 may be additionally disposed to couple the sensor 25 to the sensor installation part 224. The fastener 28 may be fastened to the plug body 22 while pressing the sensor 25. The fastener 28 may be a screw, but is not limited thereto.

The plug body 22 may have a body step 223 protruding outward from the plug body 22, and the insert body 211 of the plug insert 21 may have an insert step 214 protruding outward from the insert body 21. The body step 223 and the insert step 214 may be coupled together by ultrasonic welding. The body step 223 and the insert step 214 may have outer diameters larger than the diameter of the socket opening 1161. Accordingly, when the plug 20 is inserted into the socket 10, the body step 223 and the insert step 214 may be stopped by the socket 10 so that the plug 20 can no longer be inserted into the socket 10.

Accordingly, despite repeated use of the quick connector, coupling and water tightness may be easily maintained.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist and, unless specifically described to the contrary, do not exclude but may include additional components. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A quick connector comprising:
a socket having a socket opening formed therein; and
a plug horizontally inserted into and coupled to the socket through the socket opening,
wherein the socket includes a socket body having a socket space that is in communication with the outside through the socket opening and into which the plug is inserted and a latch configured to, in a locking position, hamper insertion of the plug into the socket space or stop the plug inserted into the socket space from escaping to the outside,
wherein the plug includes an insert body inserted into the socket space, an insert O-ring configured to surround the insert body to maintain water tightness between the insert body and an inside surface of the socket body when the insert body is inserted into the socket space, and an insert hook further protruding outward from the insert body beyond an outside surface of the insert O-ring,
wherein the latch includes a latch frame configured to move between a default position and the locking position, a latch opening formed in the latch frame, and a latch step configured to hide part of the latch opening, the latch step being disposed on a side surface of the latch frame such that when the insert body, together with the insert O-ring, is inserted into the socket space through the latch opening in the locking position, the insert O-ring does not make contact with the latch step, but the insert hook makes contact with the latch step,
wherein the latch opening includes a plurality of latch openings, and
wherein the latch step is disposed on an inside surface of the latch configured to define at least one of the plurality of latch openings and is not disposed on an inside surface of the latch configured to define at least one other latch opening such that the insert hook inserted to the at least one other latch opening does not make contact with the latch step in the locking position.

2. The quick connector of claim 1, wherein the insert hook protrudes from the insert body, and
wherein the latch step is disposed on an inside surface of the latch frame.

3. The quick connector of claim 2, wherein a height by which the insert hook protrudes from the insert body is greater than a distance from the insert body to the latch step placed in the locking position, when a distal end of the insert body is inserted into the socket space.

4. The quick connector of claim 2, wherein the plug further includes an insert guide protruding from the insert body to guide insertion of the insert body into the socket space without a collision of the insert body with the inside surface of the socket body.

5. The quick connector of claim 1, wherein the insert hook has an inclined shape further protruding outward while getting farther away from the socket, such that the insert hook is inserted into the socket body while pushing the latch step placed in the locking position when the plug is inserted into the socket.

6. The quick connector of claim 1, wherein the insert O-ring is disposed in an insert outside-groove concavely formed on the insert body in a radial direction.

7. The quick connector of claim 1, wherein a profile of the latch opening includes an upper profile formed in an arc shape convex upward, a lower profile formed in a curved shape including an arc shape convex downward, and an intermediate profile formed of two line segments connecting the upper profile and the lower profile in an up/down direction.

8. The quick connector of claim 7, wherein a portion of the lower profile configured to form the arc shape convex downward has a smaller radius of curvature than the upper profile.

9. The quick connector of claim 1, wherein the latch opening includes three latch openings, and wherein the latch step is not disposed on an inside surface of the latch configured to define a latch opening located in the center among the three latch openings.

* * * * *